United States Patent
Rector

(10) Patent No.: US 10,421,081 B2
(45) Date of Patent: Sep. 24, 2019

(54) CENTRIFUGE WITH VECTOR-SEEKING LINKAGE

(71) Applicant: National Technology & Engineering Solutions of Sandia, LLC, Albuquerque, NM (US)

(72) Inventor: Michael N. Rector, Tijeras, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 730 days.

(21) Appl. No.: 14/735,008

(22) Filed: Jun. 9, 2015

(65) Prior Publication Data

US 2016/0175855 A1 Jun. 23, 2016

Related U.S. Application Data

(60) Provisional application No. 62/094,613, filed on Dec. 19, 2014.

(51) Int. Cl.
  *B04B 9/10* (2006.01)
  *B04B 5/04* (2006.01)
  *G01C 25/00* (2006.01)

(52) U.S. Cl.
  CPC .............. *B04B 9/10* (2013.01); *B04B 5/0421* (2013.01); *G01C 25/005* (2013.01)

(58) Field of Classification Search
  CPC ........ B04B 5/0421; B04B 9/10; G01C 25/005
  USPC ..................................... 494/37, 67
  See application file for complete search history.

(56) References Cited

U.S. PATENT DOCUMENTS

| 6,249,344 | B1 * | 6/2001 | Virag | G01N 15/042 356/244 |
|---|---|---|---|---|
| 7,208,408 | B2 | 4/2007 | Yuasa et al. | |
| 8,747,290 | B2 | 6/2014 | Miltenyi et al. | |
| 8,900,112 | B2 | 12/2014 | Holmes et al. | |
| 8,911,809 | B2 | 12/2014 | Garwood | |
| 8,998,789 | B2 | 4/2015 | Toi et al. | |
| 2013/0183640 | A1 | 7/2013 | Comtois | |
| 2013/0324388 | A1 | 12/2013 | Guedes | |

(Continued)

FOREIGN PATENT DOCUMENTS

JP  3280386 B2 *  5/2002  ........... G01N 15/042

OTHER PUBLICATIONS

Sain, "Small Centrifuge Test Methods and Operations: A Primer-Reader With Historical Anecdotes", Sandia Report SAND83-2666, Jun. 1986, 81 pages.

*Primary Examiner* — Walter D. Griffin
*Assistant Examiner* — Shuyi S. Liu
(74) *Attorney, Agent, or Firm* — Medley, Behrens & Lewis, LLC; Samantha Updegraff

(57) ABSTRACT

Technologies pertaining to a centrifuge that comprises a vector-seeking linkage are disclosed herein. In a general embodiment, the centrifuge comprises a spindle that is rotatable about an axis of rotation. The centrifuge also has an arm that is coupled to the spindle, and a vector-seeking linkage that is coupled to the arm. The vector-seeking linkage provides two rotational degrees of freedom with respect to a load coupled to the vector-seeking linkage. The centrifuge is well-suited for a variety of applications, including sensor testing, solution separation, and producing accelerations expected to be experienced during flight.

4 Claims, 7 Drawing Sheets

(56) References Cited

U.S. PATENT DOCUMENTS

2014/0087866 A1\* 3/2014 Schluesselberger ..... G09B 9/14
 463/30
2014/0212961 A1 7/2014 Miltenyi et al.

\* cited by examiner

CENTRIFUGE WITH VECTOR-SEEKING LINKAGE

RELATED APPLICATION

This application claims priority to U.S. Provisional Patent Application No. 62/094,613, field on Dec. 19, 2014, and entitled "VECTOR-SEEKING ACCELERATION SIMULATOR", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

It can be difficult to create a testing environment that is conducive to testing operation of inertial sensors. For example, inertial sensors may be designed to detect motion in any of six degrees: linear motion along the X, Y and Z axes, as well as rotation about such axes (roll, pitch, and yaw). Accordingly, when testing operability of inertial sensors, linear and rotational forces are produced, and the inertial sensors are exposed to these forces. Conventional systems for producing these forces are fixed platforms such as, for example, centrifuges, tracks, and elevators. At least some of these systems, however, are not well suited for producing force (e.g., an acceleration vector) with an appropriate profile over time.

SUMMARY

Technologies pertaining to a centrifuge that is configured to align a load, rotated by the centrifuge, with an acceleration vector that is formed during operation of the centrifuge are disclosed herein. In a general embodiment, the centrifuge is configured such that the load is in alignment with the sum of tangential, centripetal, and gravitational acceleration vectors formed during operation of the centrifuge. As will be described in greater detail herein, the centrifuge can be employed in connection with producing an acceleration vector with a known profile over time (for purposes of flight simulation, sensor testing, etc.), as well as speeding up the process of solution separation when the centrifuge is employed in connection with separating heterogeneous elements of a solution.

An exemplary centrifuge comprises a spindle that is rotatable about an axis of rotation. The centrifuge further comprises an arm that has a proximal end and a distal end, where the proximal end is, for example, coupled to the spindle and positioned proximate to the axis of rotation. The arm extends away from the axis of rotation, such that the distal end of the arm is further from the axis of rotation than the proximal end of the arm. The arm may be formed of a rigid or flexible material. The centrifuge further comprises a vector-seeking linkage that is coupled to the arm at the distal end of the arm. In an example, the vector-seeking linkage can be a U-joint, a gimbal (e.g. a two-axis gimbal), a cable, or the like. A load is attached to the vector-seeking linkage, such that the vector-seeking linkage acts to mechanically link the load to the arm (and thus, the spindle). Pursuant to an example, the load may be or include an inertial sensor, a solution with heterogeneous, separable elements, a human being, or other suitable load.

The centrifuge may also comprise a motor and a control circuit, wherein the motor is configured to drive the spindle (e.g., cause the spindle to rotate about the axis of rotation) and the control circuit is configured to control operation of the motor. The centrifuge may also optionally include a brake that is applicable to the spindle, such that rotational velocity of the spindle can be relatively quickly reduced via the brake.

In operation, the load is coupled to the vector-seeking linkage, and the centrifuge is "spun up". With more particularity, the spindle is caused to rotate about the axis of rotation, which results in the arm, the vector-seeking linkage, and the load rotating about the axis. As the spindle is rotated, the load can be subjected to three linear forces: gravitational, centripetal, and tangential. The vector-seeking linkage is configured to cause the load to be aligned with a linear acceleration vector, which is the summation of the above-referenced linear forces. With more particularity, the vector-seeking linkage allows the load to be rotated about a first axis corresponding to the centripetal force as well as a second axis corresponding to the tangential force. Thus, without accounting for frictional forces corresponding to air and the vector-seeking linkage, the load is subjected to a single linear acceleration vector, which is in contrast to conventional systems, where the load is subjected to three acceleration vectors that are orthogonal to one another.

Further, magnitude of the acceleration vector can be controlled based upon known operating parameters of the centrifuge (e.g., length of the arm and force applied to the spindle). Therefore, the centrifuge can be operated to cause the load to be subjected to a linear acceleration vector with a known magnitude profile over time. Thus, if it is desired to test operation of an inertial sensor, the inertial sensor can be subjected to a linear acceleration force with a known magnitude profile, and output of the inertial sensor over time can be compared with the known magnitude profile to ascertain whether the inertial sensor is operating within predefined tolerances. In another example, a human can be subjected to a linear acceleration vector that is expected to be experienced during flight. In still yet another example, the centrifuge may be "spun down" more quickly when used to separate heterogeneous elements in a solution, since the vector-seeking linkage allows a vial (or other container) that includes the solution to stay aligned with the separation acceleration vector and thus avoid mixing.

Additional features and advantages are described herein, and will be apparent from the following Detailed Description and the figures.

DETAILED DESCRIPTION

Figure 1:
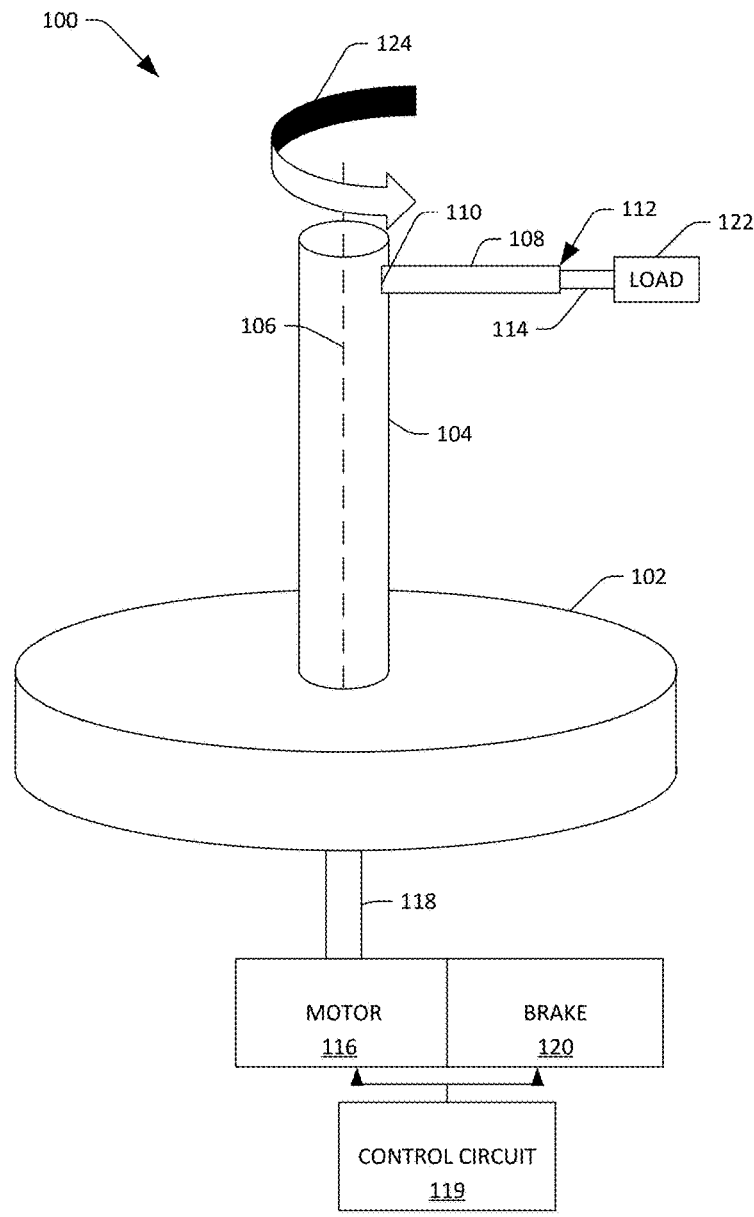
FIG. 1 is a schematic of an exemplary centrifuge.

Various technologies pertaining to a centrifuge that comprises a vector-seeking linkage are disclosed herein. With reference now to FIG. 1, in a general embodiment, a centrifuge 100 optionally includes a base 102, such that the centrifuge 100 can be placed on a level surface (e.g., a table, a floor, etc.). The centrifuge 100 also comprises a spindle 104 that is rotatable about an axis of rotation 106. The centrifuge 100 further comprises an arm 108 that has a proximal end 110 and a distal end 112. As illustrated in FIG. 1, the proximal end 110 of the arm 108 is coupled to the spindle 104 of the centrifuge 100, and is positioned proximate to the axis of rotation 106. The arm 108 extends from the axis of rotation 106, such that the distal end 112 of the arm 108 is further from the axis of rotation 106 than the proximal end 110 of the arm 108.

The centrifuge 100 further includes a vector-seeking linkage 114 that is mechanically coupled to the arm 108 at the distal end 112 of the arm 108. As will be described in greater detail below, the vector-seeking linkage 114 can be a U-joint, a two axis gimbal, a three axis gimbal, a cable, or the like. The vector-seeking linkage 114 is configured to allow for rotation about at least two linear axes during operation of the centrifuge 100: a first axis corresponding to the force of gravity; and a second axis corresponding to tangential force produced during operation of the centrifuge 100.

The centrifuge 100 optionally includes a motor 116 that is coupled to the spindle 104 by way of a linkage 118. The centrifuge 100 also optionally includes a control circuit 119 that is configured to output control signals that control operation of the motor 116, and hence, controls velocity and direction of rotation of the spindle 104 about the axis of rotation 106. The control circuit 119 can be any suitable circuit or processor that is programmed to control operation of the motor 116. Thus, the control circuit 119 can be or include an application-specific integrated circuit (ASIC), a microprocessor programmed to control operation of the motor 116, etc. The centrifuge 100 also optionally includes a brake 120 that can be controlled by the control circuit 119 or manually controlled by an operator of the centrifuge 100. The brake 120 can be configured to apply a brake directly to the motor 116, the linkage 118, and/or the spindle 104. Thus, the brake 120 can be operated to reduce rotational velocity of the spindle 104 when "spinning down" the centrifuge 100.

Operation of the centrifuge 100 is now set forth. A load 122 can be coupled to the vector-seeking linkage 114, such that the load 122 is mechanically linked to the arm 108 and the spindle 104. The load 122 may be a variety of loads, and selection of a type of the load 122 depends upon an application in which the centrifuge 100 is employed. For example, the load 122 can be or include an inertial sensor, such as an accelerometer. In another example, the load 122 can be a vial or other suitable container for retaining a solution that comprises heterogeneous (separable) elements. In still yet another example, the load 122 may be a human being, where it is desirable to subject the human being to an inertial force producible by the centrifuge 100.

The control circuit 119 generates control signals and transmits the control signals to the motor 116. The motor 116, responsive to receipt of the control signals, exerts rotational force on the linkage 118, and thus the spindle 104, causing the spindle 104 to rotate about the axis of rotation 106 (as illustrated by arrow 124). In another example, rather than the centrifuge 100 including the motor 116, the centrifuge 100 can comprise a crank coupled to a gear (or other mechanical mechanism), thereby allowing for the spindle 104 to be rotated via manually-applied force.

As the arm 108 is coupled to the spindle 104, the arm 108, the vector-seeking linkage 114, and the load 122 likewise rotate about the axis of rotation 106. Prior to the spindle 104 being rotated about the axis of rotation 106, the load 122 is subjected to force in a single direction, e.g. gravitational force. As the spindle 104 (and thus, the arm 108, the vector-seeking linkage 114, and the load 122) begins to rotate (e.g., as the motor 116 applies rotational force to the spindle 104), the load 122 is subjected to two additional linear forces: 1) centripetal force (horizontally from the axis of rotation 106 to the load 122); and 2) tangential force (horizontally and tangentially to the rotational motion of the load 122). As noted above, the vector-seeking linkage 114 provides at least two degrees of rotational freedom, wherein the load 122 is rotatable about a first axis based upon centripetal and gravitational forces and is rotatable about a second axis based upon tangential and gravitational forces. Hence, the vector-seeking linkage 114 acts to align the load 122 with a summation of the gravitational, centripetal, and tangential force vectors (e.g., a single linear acceleration vector).

While the vector-seeking linkage 114 naturally "seeks" the force vector that is the sum of centripetal, gravitational, and tangential forces, abrupt acceleration or deceleration of the spindle 104 (and thus the arm 108) may cause the vector-seeking linkage 114 to oscillate ("swing"), thereby causing the load 122 to oscillate. The control circuit 119 can be configured to control the motor 116 to mitigate such oscillation. In another example, the vector-seeking linkage 114 can be associated with a mechanical damper to mitigate these oscillations. Alternatively, the oscillations can be tolerated.

Alignment of the load 122 with the acceleration vector allows for the centrifuge 100 to be well-suited for a variety of applications. In an example, the centrifuge 100 may be particularly well-suited for application in testing operability of an inertial sensor. In such an application, the load 122 can be or include the inertial sensor. For example, the load 122 may be a smart phone or other suitable portable electronic device (such as a watch) that includes the inertial sensor. The control circuit 119 outputs control signals to the motor 116 that causes the motor 116 to rotate the spindle 104 with a known force (over time), thus producing a known acceleration profile along the acceleration vector applied to the load 122. For example, since 1) the force applied to the spindle 104 (and thus angular acceleration of the load 122 about the axis of rotation 106) is known; 2) the force of gravity is known; and 3) length of the arm 108 is known, the direction and magnitude of the acceleration vector to which the load 122 is subjected can be computed in time (thereby computing a known acceleration profile). The inertial sensor can output data as the centrifuge 100 is operated, and this output data can be compared with the known acceleration profile. Based upon the comparison of the output of the sensor with the known acceleration profile, an indication can be generated as to whether the sensor is operating within predefined tolerances (e.g., whether the sensor is suitable for inclusion in the smart phone or other electronic device).

The centrifuge 100 shown in FIG. 1, as noted above, is particularly well-suited for testing operability of inertial sensors for a variety of reasons. For example, some accelerometers are sensitive to cross-talk—that is, acceleration in orthogonal axes may affect performance in the input axis. The vector-seeking linkage 114 acts to eliminate or minimize accelerations in the orthogonal axes, which is different from fixed-mount centrifuge testing. Further, the vector-seeking linkage 114 may introduce gyrations as the centrifuge 100 is operated; introduction of these gyrations is acceptable when the load 122 is an accelerometer (for example), since accelerometers are not sensitive to gyrations.

In another exemplary application, the centrifuge 100 can be particularly well-suited to speed up the process of separating heterogeneous elements in a solution compared to conventional techniques for doing so. For instance, the load 122 can be a vial or other suitable container that includes a solution with heterogeneous (separable) elements. The spindle 104 can be rotated (e.g., through operation of the motor 116 or manually through utilization of a crank or other mechanism), which can result in the solution in the vial or container being subjected to an acceleration vector with relatively high magnitude, thereby causing the heterogeneous elements to become separated. Once the separable elements are separated, the brake 120 can be employed to relatively quickly "spin down" the centrifuge 100. Because the load 122 is free to rotate about the axis corresponding to tangential force (e.g., generated by the brake 120), the direction of the acceleration vector will relatively smoothly alter. In other words, the solution is not subjected to instantaneous introduction of tangential acceleration that is orthogonal to the centripetal force applied to the load 122. That is, the vector-seeking linkage 114 allows the vial to "swing", thus inhibiting "splashing" of solution against walls of the vial and re-mixing of the solution. In contrast, fixed or single axis centrifugal separators require significant ramp down time to avoid remixing. As the vector-seeking linkage 114 allows for two rotation axes to track and isolate acceleration to a single axis during ramp-up, amount of time to ramp down (without remixing) can be decreased compared to the fixed or single axis separators.

In another exemplary application, the centrifuge 100 may be particularly well-suited for subjecting a human to an acceleration vector that the human is likely to encounter during flight (e.g., airplane flight, shuttle flight, etc.). In such an application, the load 122 is the human. The control circuit 119 can be caused to control operation of the motor 116, such that the spindle 104 is rotated about the axis of rotation 106, thereby causing a linear acceleration vector with a known, desired profile to be delivered to the human. That is, the centrifuge 100 can produce an acceleration vector that would be similar or equivalent to a linear acceleration experienced by the human during, for example, takeoff or landing. In an exemplary embodiment, when the load 122 is a human, the vector-seeking linkage 114 can optionally be configured to swing in the tangential direction only without centripetal swing if relatively simple horizontal accelerations are desired and gravity is to remain constant. In such a case, the centrifuge 100 would generate a horizontal flight or road-like acceleration profile. Thus, the centrifuge 100 can be configured to cause the human to experience acceleration profiles that are expected to be experienced when the human is driving a car, operating a hovercraft, etc. In such a case, the starting angle are optionally different—for instance, the vector-seeking linkage 114 can be fixed such that the load 122 initially does not "hang" (the vector-seeking linkage 114 can be started in a horizontal position). Other applications are also contemplated.

Still further, concepts described above are applicable on a 3-axis table that is usable to produce desired acceleration profiles. The vertical axis of the table is analogous to the spindle 104, and the other 2 axes seek the summed force vector.

Figure 2:
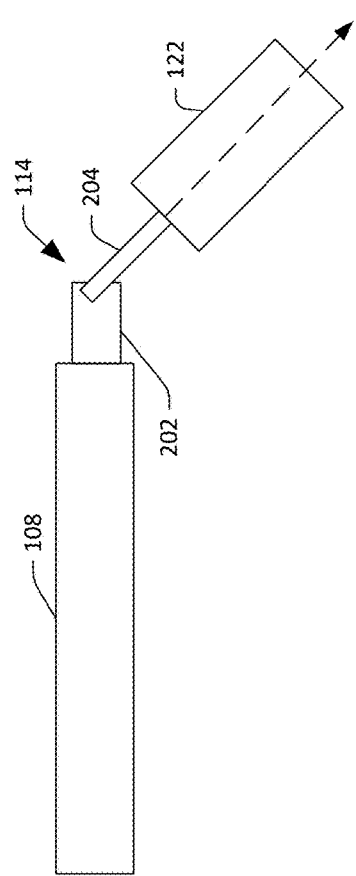
FIG. 2 is a schematic that illustrates a load coupled to a centrifuge arm by way of a U-joint.

With reference now to FIG. 2, a schematic that illustrates the arm 108, the vector-seeking linkage 114, and the load 122 is illustrated. In this example, the vector-seeking linkage 114 is a U-joint that includes a first U-shaped element 202 linked with a second U-shaped element 204. With reference to a coordinate system 206, the Y-axis represents an axis corresponding to gravity. The U-joint provides rotational freedom about an axis corresponding to centripetal and gravitational forces (e.g., the Z-axis), and further provides rotational freedom about an axis corresponding to tangential and gravitational forces (e.g., the YX-axis).

Figure 3:
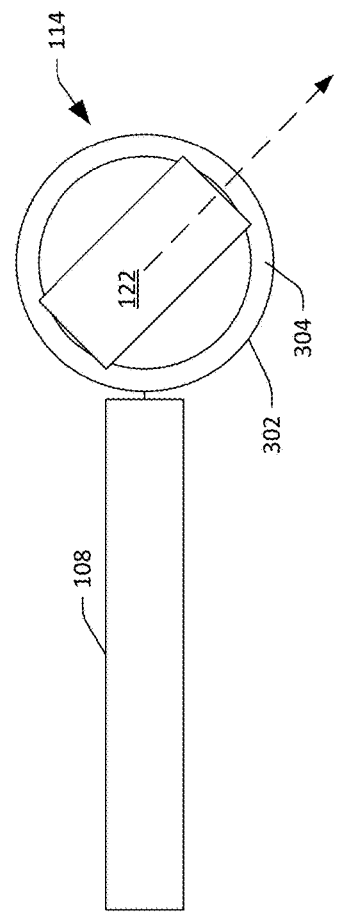
FIG. 3 is a schematic that illustrates a load coupled to a centrifuge arm by way of a multi-axis gimbal.

With reference to FIG. 3, another exemplary schematic illustrating the arm 108 with the vector-seeking linkage 114 coupled thereto and the load 122 attached to the vector-seeking linkage 114 is illustrated. In this example, the vector-seeking linkage 114 is a two-axis gimbal with two rings 302 and 304. The external ring 302 can allow the load 122 to rotate about the Z axis, while the internal ring 304 can allow the load 122 to rotate about the X axis. While not shown, as mentioned above, the vector-seeking linkage 114 may alternatively be a flexible cable which may provide additional rotational freedom. In yet another example, the arm 108 can be constructed of a relatively flexible material, such that the arm 108 itself acts as the vector-seeking linkage 114.

Figure 4:
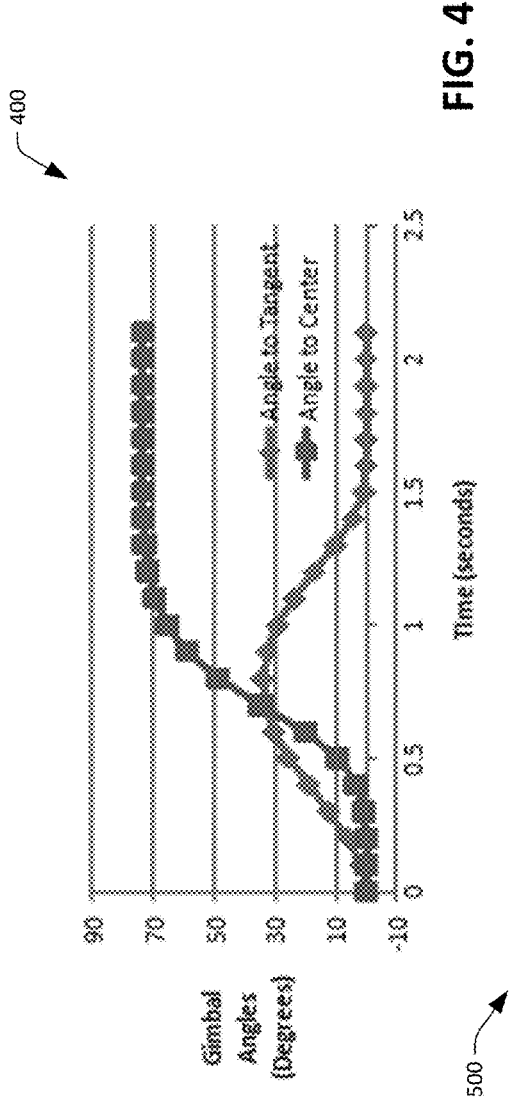
FIG. 4 is a graph that illustrates gimbal angles relative to a tangent and center of a centrifuge as the centrifuge is operated.
Figure 5:
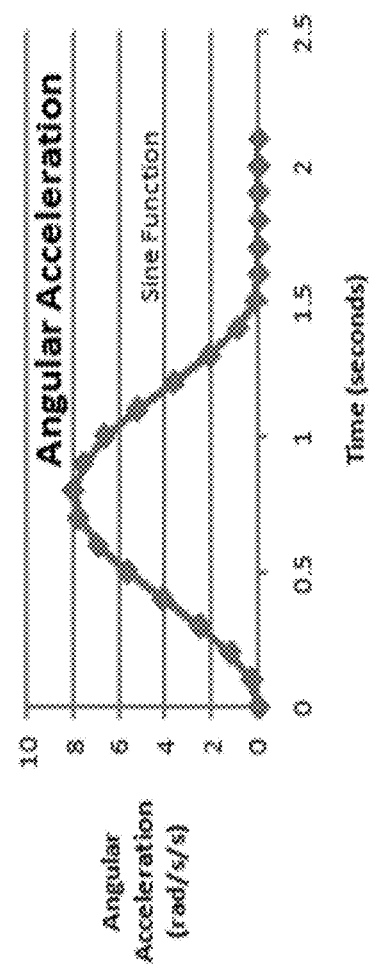
FIG. 5 illustrates an exemplary angular acceleration profile.

With reference now to FIGS. 4 and 5, exemplary graphs 400 and 500 are respectively illustrated. The graphs 400 and 500 illustrate respective angles of the gimbal rings 302 and 304 (e.g., amounts of rotation about the Z and X axes) in time (FIG. 4) with respect to angular acceleration of the spindle 104 (and thus the load 122) in time (FIG. 5). It can be ascertained that as the centrifuge 100 is "spun up", the centripetal force applied to the load is relatively low (as evidenced by the relatively small amount of rotation about the Z axis, which indicates that gravitational force is greater than the centripetal force), while the tangential force applied to the load is higher (as evidenced by the higher amount of rotation about the X axis). The tangential force, however, tracks with angular acceleration of the spindle 104, while the centripetal force tracks with angular velocity of the spindle 104.

Figure 6:
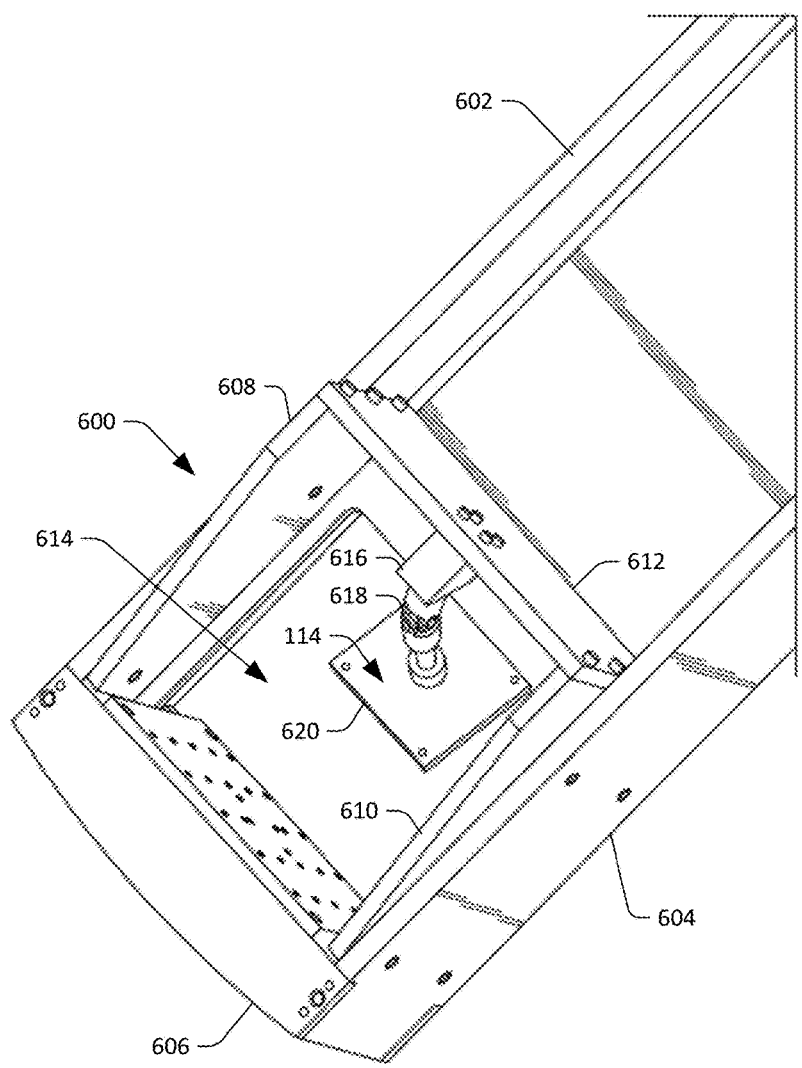
FIG. 6 is an isometric view of an exemplary centrifuge arm.

With reference now to FIG. 6, an isometric view of an exemplary centrifuge arm 600 is illustrated. The centrifuge arm 600 comprises an I-beam having two plates 602 and 604 that extend approximately in parallel with one another. The centrifuge arm 600 additionally includes a u-shaped bracket 606, wherein the two plates 602 and 604 are held stable with respect to one another by the u-shaped bracket 606. The u-shaped bracket 606 can be secured to the plates 602 and 604 by any suitable coupling mechanism, such as threaded fastener and bolt, rivets, or the like.

The centrifuge arm 600 also includes a second set of plates 608 and 610 that are respectively attached to the plates 602 and 604 and extend in parallel with the plates 602 and 604, in an interior region of the centrifuge arm 600. The second set of plates 608 and 610 can be attached to the plates 602 and 604, respectively, by any suitable securing mechanism. A support plate 612 is secured to the plates 608 and 610, and extends orthogonal to such plates 608 and 610 (and in parallel with a face of the u-shaped bracket 606). The plates 608 and 610, the u-shaped bracket 606, and the support plate 612 form a holding region 614 in the centrifuge arm 600.

The vector-seeking linkage 114 is secures to the support plate 612, such that the load 122, when the centrifuge arm 600 is rotated, is within the holding region 614. The plates 608 and 610, the u-shaped bracket 606, and the support plate 612 can shield the load 122 from air as the centrifuge arm 600 rotates about its axis of rotation. With more particularity, the vector-seeking linkage 114 includes a base 616 that is secured to the support plate 612 by way of suitable securing mechanisms. A mechanical linkage 618, such as a U-joint or multi-axis gimbal, extends from the base 616. The mechanical linkage 618 allows for the attached load 122 to freely swing with tangential and gravitational forces that exist during operation of the centrifuge. The vector-seeking linkage 114 also includes an attachment plate 620, which is secured to the mechanical linkage 618. The load 122 is securable to the attachment plate 620 by way of suitable securing mechanisms (threaded bolt and fastener, rivets, clamps, etc.).

Figure 7:
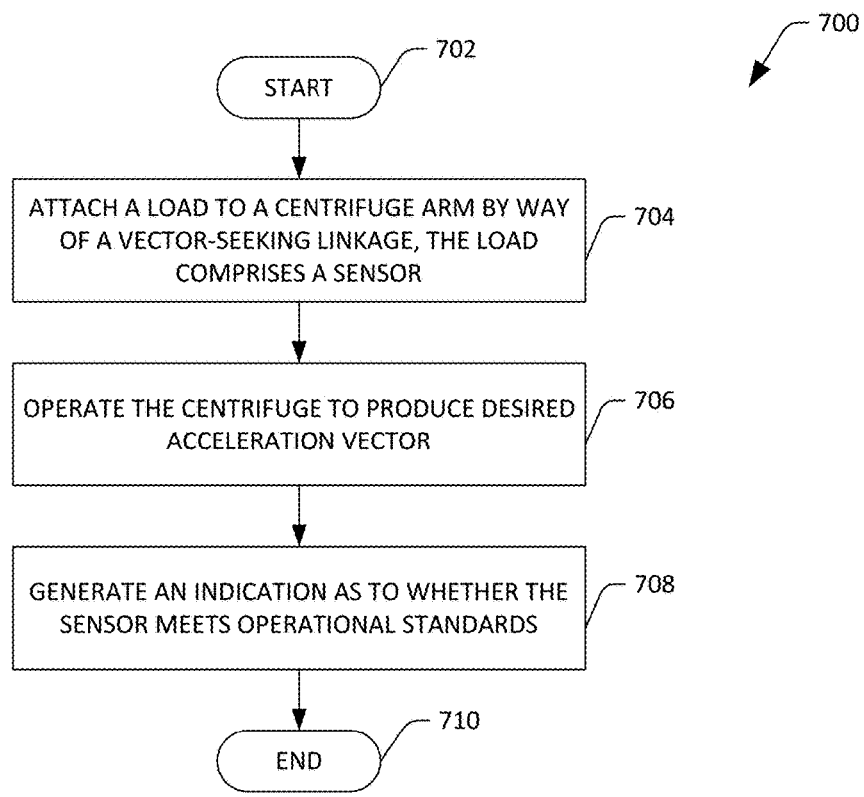
FIG. 7 is a flow diagram that illustrates an exemplary methodology for testing an inertial sensor.
Figure 8:
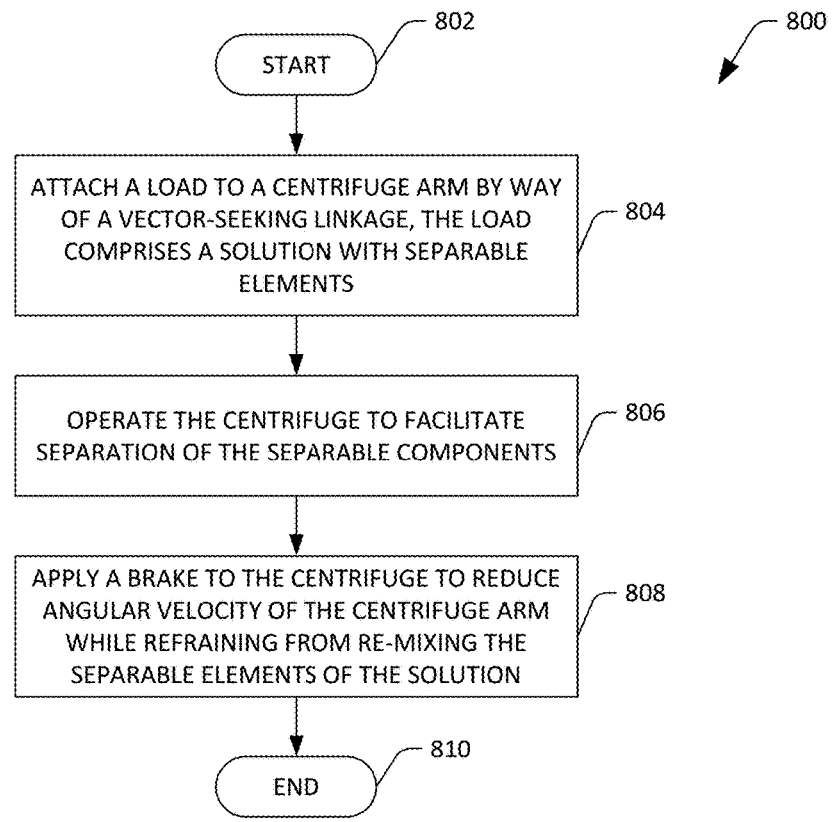
FIG. 8 is a flow diagram that illustrates an exemplary methodology for separating heterogeneous elements of a solution through utilization of a centrifuge.
Figure 9:
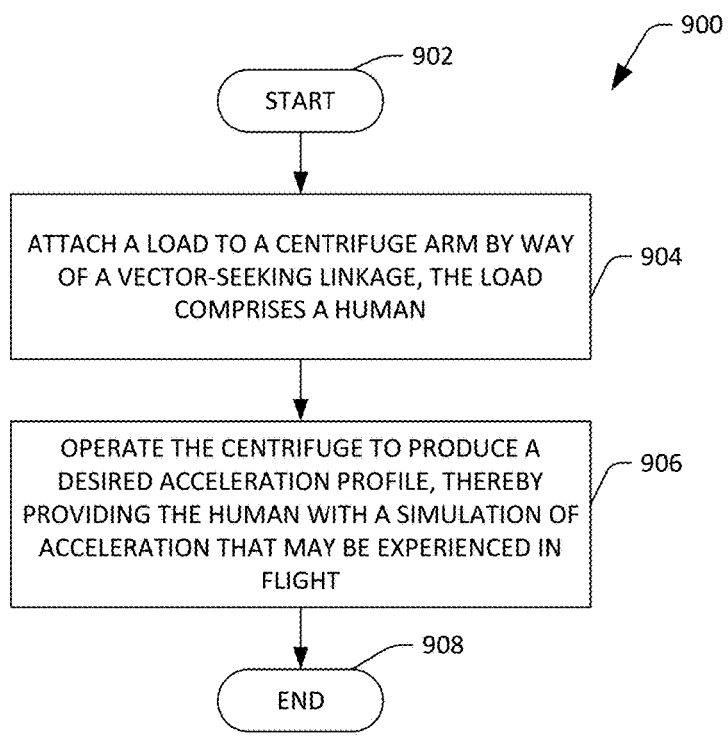
FIG. 9 is a flow diagram that illustrates an exemplary methodology for producing a linear acceleration vector that is expected to be experienced by a human in flight.

FIGS. 7-9 illustrate exemplary methodologies relating to operation of a centrifuge that comprises a vector-seeking linkage. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Now referring to FIG. 7, an exemplary methodology 700 that facilitates testing an inertial sensor is illustrated. The methodology 700 starts at 702, and at 704, a load is attached to a centrifuge arm by way of a vector-seeking linkage, wherein the load comprises an inertial sensor. At 706, the centrifuge is operated to produce a desired acceleration profile that is to be applied to the inertial sensor. For example, the control circuit 119 can be configured to drive the motor 116 such that the linear acceleration vector experienced by the load 122 has a known profile over time. Values output by the sensor can be captured and compared with the known acceleration profile. At 708, an indication as to whether the sensor meets operational standards is generated based upon the comparison of the values generated by the inertial sensor with the known acceleration profile generated through operation of the centrifuge. If the inertial sensor meets operational standards, the inertial sensor can be deployed. If the inertial sensor fails to meet operational standards, the inertial sensor may be discarded. While the examples above have referred to the inertial sensor being included in smart phones or other electronic devices, inertial sensors used in other applications are also contemplated. For example, in certain flight applications it may be critical that the inertial sensor accurately outputs data that is indicative of acceleration of a moving body, such as a drone, an airplane, a shuttle, etc. Because the centrifuge is able to produce acceleration vectors that may be experienced in the real world, operability of the inertial sensor can be accurately tested. The methodology 700 completes at 710.

Now referring to FIG. 8, a flow diagram illustrating an exemplary methodology 800 for separating heterogeneous elements in a solution is illustrated. The methodology 800 starts at 802, and at 804, a load is attached to a centrifuge arm by way of a vector-seeking linkage, wherein the load comprises a solution with separable elements. At 806, the centrifuge is operated to facilitate separation of the separable elements. At 808, a brake is applied to the centrifuge to reduce angular velocity of the centrifuge arm, while refraining from re-mixing the separable elements of the solution. For example, since the load (vial or container with the solution) can swing about at least two axes, when the brake is applied to the centrifuge, the vial or container will "swing", thus allowing for the solution to remain relatively stable in the container instead of re-mixing in the container. The methodology 800 completes at 810.

Now referring to FIG. 9, an exemplary methodology 900 that facilitates producing an acceleration vector that may be experienced by a human in flight is illustrated. The methodology 900 starts at 902, and at 904, a load is attached to a centrifuge arm by way of a vector-seeking linkage, wherein the load comprises a human. In this case, the centrifuge is relatively large and constructed to hold the weight of the human. At 906, the centrifuge is operated to produce a desired acceleration profile that may be experienced by the human in flight. This provides the human with a simulation of acceleration that may be experienced, for example, during takeoff. The methodology 900 completes at 908.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference, and the term "about" refers to a range of 10% of the value to which the term applies.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A centrifuge system comprising:
   a spindle that is rotatable about an axis;
   an arm that extends from the rotatable spindle, the arm comprises a first member and a second member, the first and second members each having a respective proximal end and a respective distal end, the proximal ends attached to the spindle, the members extending substantially in parallel with one another;
   a support bracket coupled to the first and second members at their distal ends, the support bracket comprises a first plate, a second plate, and a support plate, the first plate and the second plate respectively coupled to the first member and the second member, the first plate and the second plate extending into an interior region of the arm between the first member and the second member, the support plate coupled to and extending between the first plate and the second plate;
   a vector-seeking linkage attached to the support plate, the vector-seeking linkage configured to receive a load and mechanically link the load to the arm, the vector-seeking linkage provides at least two rotational degrees of freedom to the load when the spindle is rotated about the axis;
   an inertial sensor coupled to the vector-seeking linkage such that the vector-seeking linkage aligns the inertial sensor with an acceleration vector to which the inertial sensor is subjected when the spindle is rotated about the axis, and wherein the inertial sensor outputs data indicative of an acceleration applied to the inertial sensor; and
   a computing system that compares the data output by the inertial sensor to a known acceleration profile of the acceleration applied to the inertial sensor and outputs an indication as to whether the inertial sensor meets an operational standard of the inertial sensor based on the comparison.

2. The centrifuge of claim 1, the vector-seeking linkage being a U-joint.

3. The centrifuge of claim 1, the vector-seeking linkage being a gimbal.

4. The centrifuge of claim 1, the vector-seeking linkage being cabling.

* * * * *